(12) United States Patent
Langguth et al.

(10) Patent No.: US 9,615,251 B2
(45) Date of Patent: Apr. 4, 2017

(54) RADIO DEVICE WITH TWO RADIO UNITS AND A METHOD FOR THE TRANSMISSION OF INFORMATION

(71) Applicant: Rohde & Schwarz GmbH & Co. KG, Munich (DE)

(72) Inventors: Torsten Langguth, Unterhaching (DE); Michael Ebersberger, Olching (DE); Rainer St Orn, Kirchheim (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 14/628,129

(22) Filed: Feb. 20, 2015

(65) Prior Publication Data

US 2015/0350903 A1 Dec. 3, 2015

(30) Foreign Application Priority Data

Feb. 20, 2014 (DE) ........................ 10 2014 203 089

(51) Int. Cl.

| | |
|---|---|
| *G06F 21/00* | (2013.01) |
| *H04L 9/32* | (2006.01) |
| *H04L 29/06* | (2006.01) |
| *H04W 12/06* | (2009.01) |
| *H04W 36/14* | (2009.01) |
| *H04W 12/08* | (2009.01) |
| *H04W 12/10* | (2009.01) |
| *H04W 48/18* | (2009.01) |
| *G06F 21/53* | (2013.01) |
| *G06F 7/04* | (2006.01) |

(Continued)

(52) U.S. Cl.
CPC ............ *H04W 12/06* (2013.01); *G06F 21/53* (2013.01); *H04L 9/3263* (2013.01); *H04L 63/105* (2013.01); *H04W 12/08* (2013.01); *H04W 12/10* (2013.01); *H04W 36/14* (2013.01); *H04W 48/18* (2013.01); *H04L 2209/80* (2013.01); *H04W 88/06* (2013.01)

(58) Field of Classification Search
None
See application file for complete search history.

(56) References Cited

U.S. PATENT DOCUMENTS 5,969,670 A * 10/1999 Kalafus ................... G01S 19/20
244/183
7,551,988 B1 * 6/2009 Wichgers ............. G08G 5/0021
340/2.1

(Continued)

FOREIGN PATENT DOCUMENTS

| DE | 102007033914 A1 | 12/2008 |
|---|---|---|
| EP | 2245744 B1 | 8/2012 |
| EP | 2544383 A1 | 1/2013 |

*Primary Examiner* — Shin-Hon Chen
(74) *Attorney, Agent, or Firm* — Potomac Technology Law, LLC (57) ABSTRACT

A radio device is provided with a first radio unit and a second radio unit, wherein the first radio unit provides a certified functionality which is certified by an authorized certification authority. The second radio unit provides a certified functionality, wherein the functionality of the second radio unit is different from the functionality of the first radio unit, and the functionality of the second radio unit is similarly certified by an authorized certification authority. Furthermore, a method is provided for the transmission of information via the radio device.

16 Claims, 3 Drawing Sheets

(51) Int. Cl.
  *G06F 15/16* (2006.01)
  *G06F 17/30* (2006.01)
  *H04W 88/06* (2009.01)

(56) References Cited

U.S. PATENT DOCUMENTS

| | | | | |
|---|---|---|---|---|
| 7,831,255 B1* | 11/2010 | Gribble | ............... | H04B 17/354 370/329 |
| 2002/0101378 A1* | 8/2002 | Quinn | ................... | G06F 1/1616 343/702 |
| 2003/0067902 A1* | 4/2003 | Skeba | ..................... | G06F 21/10 370/338 |
| 2003/0083055 A1* | 5/2003 | Riordan | ............ | H04M 3/42178 455/419 |
| 2008/0163334 A1* | 7/2008 | Perich | ................... | H04W 8/245 726/1 |
| 2008/0221951 A1* | 9/2008 | Stanforth | ............. | G06Q 10/063 705/7.41 |
| 2009/0222902 A1* | 9/2009 | Bender | ............... | H04L 63/0823 726/10 |
| 2009/0279523 A1* | 11/2009 | Doi | ...................... | H04B 7/0617 370/338 |
| 2010/0146614 A1* | 6/2010 | Savoor | ................ | H04L 63/0823 726/10 |
| 2011/0077042 A1* | 3/2011 | Stanforth | .............. | H04W 72/10 455/512 |
| 2011/0269456 A1* | 11/2011 | Krishnaswamy | ....... | H04W 8/26 455/426.1 |
| 2012/0003976 A1* | 1/2012 | Bhat | ..................... | H04W 48/18 455/436 |
| 2012/0182121 A1* | 7/2012 | Mueck | .................... | H04W 8/22 340/5.2 |
| 2012/0258670 A1* | 10/2012 | Gossain | ................. | H04B 17/27 455/67.11 |
| 2012/0329395 A1* | 12/2012 | Husted | ................... | H04B 1/406 455/41.2 |
| 2013/0090057 A1* | 4/2013 | Green | ................... | H04W 12/06 455/26.1 |
| 2013/0150127 A1* | 6/2013 | Kim | ........................ | H04W 24/02 455/561 |
| 2014/0282869 A1* | 9/2014 | Dabbiere | ................. | H04L 63/10 726/3 |
| 2015/0017910 A1* | 1/2015 | Li | ........................ | H04B 5/0056 455/41.1 |
| 2015/0101018 A1* | 4/2015 | Forte | ....................... | H04L 63/10 726/4 |

* cited by examiner

RADIO DEVICE WITH TWO RADIO UNITS AND A METHOD FOR THE TRANSMISSION OF INFORMATION

PRIORITY

This application claims priority of German Patent Application No. 10 2014 203 089.7, filed Feb. 20, 2014.

FIELD OF INVENTION

The invention relates to a radio device with a first radio unit and a second radio unit, and a method for the transmission of information. The invention relates in particular to a radio device for aviation.

BACKGROUND OF THE INVENTION

Contemporary radio devices must provide several levels of functional security. In this context, a distinction is made between high-security architectures for computer systems for the generation of information security (Multiple Independent Levels of Security, acronym: MILS) and the safety levels for radio devices to be provided according to the invention (Multiple Independent Levels of Safety, acronym: MILSF). Radio devices with MILSF are found primarily in avionics and in the context of air traffic control (Air Traffic Control, acronym: ATC).

MILSFs are specified in several technical standards. In particular, examples for this are the standards IEC62304 or DIN EN60601 for medical technology; the standard EN50128 for railway technology; the standard IEC61508 for industry; the standard ISO26262 for the automobile industry; the standards DO-178B/C, ID-12B/C or DO-254 for avionics; and the standards DO-278A or ID-109A for ATC.

All of these standards define different levels of security which a radio device must provide in order to offer specific functionalities. Corresponding to the specific function, the security of the vehicle or aircraft in which the radio device is installed is at greater or lesser risk. Dependent upon the risk effects, different requirements are placed on the development process. A radio device which is operated according to one of the standards listed must be able to demonstrate these levels of security. Dependent upon these levels, different development methods are permitted or respectively prohibited, and accordingly, different obligations arise with regard to documentation and checking. In particular, in the case of aviation, these levels are also designated as development security levels (Design Assurance Level, acronym: DAL). In this context, the failure of a given function of the radio device is evaluated corresponding to a potentially occurring effect. The more serious the occurring effect can be, the higher the DAL will be according to which the relevant functionality of the radio device must be evaluated. In particular, a high evaluation level means a considerable effort and accordingly high costs for the development and manufacture of the radio device.

In principle, it is therefore desirable to evaluate a radio device with a high DAL, while the development effort for the radio device should be kept low.

A radio-device system which is constructed in a modular manner is proposed in DE 10 2007 033 914 A1. In this context, a distinction is made between two types of module. For a first type of module, no certification by an authorized certification authority is required. A second type of module comprises an emergency radio which must be certified by an authorized certification authority in order to be approved for specific applications.

In this context, it is problematic that the module which provides no certification is not authorized for a plurality of applications, so that these radio-device systems of the prior art can be used only with limitations for applications, especially in aviation, in the rail industry or in medical technology.

Furthermore, the radio device should also be capable of expansion for future functionalities, for example, of a new encryption method or an alternative waveform. If a certified radio device is expanded, it loses the certification and must be re-certified for the application. However, this is excessively effort-intensive, and the expandability of the radio device is accordingly dispensed with. As a result, these radio devices are fit for the future only with limitations and must necessarily be replaced in due course.

What is needed, therefore, is an approach for a radio device and a method for the transmission of information that can be manufactured with low development costs and low certification costs, and which provides for fulfilment of different radio standards and for simple and efficient reconfiguration/expansion for future applications.

SUMMARY OF THE INVENTION

Embodiments of the present invention advantageously address the foregoing requirements and needs, as well as others, by providing and approach for a radio device and a method for the transmission of information which can be manufactured with low development costs and low certification costs, and which provides for fulfilment of different standards and for simple and efficient reconfiguration/expansion for future applications.

In accordance with an example embodiment, of the invention a radio device comprises a first radio unit and at least one second radio unit, wherein the first radio unit provides a certified functionality which is certified by an authorized certification authority. According to this embodiment, the second radio unit provides a certified functionality, wherein the functionality of the second radio unit is different from the functionality of the first radio unit, and the functionality of the second radio unit is similarly certified by an authorized certification authority.

The advantages achieved with this aspect of the invention can be seen especially in the fact that the radio device is certified in its entirety and provides no modules or units which have not been certified by an authorized certification authority. In order to keep down the effort for the evaluation, by way of example, the radio device is subdivided into at least two radio units. The individual radio units are certified corresponding to their functionality, wherein the different radio units provide different functionalities. The certification authority which has certified the first radio unit can, in this context, be different to or the same as the certification authority of the second radio unit.

By way of example, a property required for the radio communication, such as an encryption algorithm, a specific waveform and/or a specific transmission type, is provided as the functionality. By way of further example, an operating status or respectively operating mode of the radio device is also regarded as a functionality, for example, a multi-level standby mode, or a listening mode which must correspond to specific criteria of a standard. In this context, the functionality is the capability of the radio unit to fulfil a given function or group of functions. This relates primarily to the fitness for use, in particular, so that the first radio unit guarantees a simple radio transmission, while the second radio unit allows a complex radio transmission, for example, by means of encryption or complex waveforms.

By way of further example, different certificates are provided for the different functionalities. Accordingly, provision is made for the first radio unit to provide a first certificate relating to the functionality of the first radio unit, whereas the second radio unit provides a second certificate, different from the certificate of the first radio unit, relating to the functionality of the second radio unit.

Another aspect of the invention relates to the fact that, in a first radio unit, a high degree of failsafe security and, associated with this, a low degree of complexity of the first radio unit should be realized. An exemplary functionality of the first radio unit is accordingly an emergency radio property. The first radio unit provides a security certificate for this purpose.

In accordance with a further example embodiment, a second radio unit is preferably constructed with a higher specification and greater complexity in order to realize more complex radio transmissions. For example, an encrypted transmission is implemented with a second radio unit. Such complex and high-security radio-transmission methods are certified by means of a second certificate in order to satisfy the trustworthiness of this radio unit.

By way of example, the certificate of the first radio unit is a security certificate. This is required, in particular, in the case of flight security for straightforward functions, especially an emergency operation. In the case of security certificates, updates are always associated with a re-certification which, once again, leads to a considerable effort for evaluation.

By way of further example, the certificate of the second radio unit is an information certificate. This certificate fulfils the Common Criteria of the so-called SCA certificate. The "common criteria for the evaluation of the security of information technology" ("Common Criteria for Information Technology Security Evaluation", abbreviated as Common Criteria or CC) are an international standard on the criteria for evaluation and certification of the security of computer systems with regard to data security and corresponding unauthorized manipulation of data. The CC should be differentiated from the data protection and the security certificate of the first radio unit. The CC define seven levels of trustworthiness, EAL 1 to 7, which describe the correctness of the implementation of the system observed or respectively the depth of testing. With an increasing level of trustworthiness, the requirements for the depth with which the manufacturers must describe their product and with which the product must be tested increase.

By way of further example, in this context, it may be possible to integrate new and, in particular, complex waveforms—which are constantly being newly developed as transmission methods—into the second radio unit of the radio device without the certificate already obtained becoming per se invalid. The information certificate is characterized in that it displays a special functionality. In particular, provision is made for the certificate to retain its validity after an expansion of the second radio unit with regard to its functionality. A new functionality is especially a new waveform which is reloaded within the framework of a Service-Component-Architecture (acronym: SCA) certificate.

The first radio unit, for example, is characterized in that it provides a high DAL and is certified for this. By contrast, the second radio unit is provided with an information certificate. This means that all elements of the radio device are advantageously certified and authorized for a specific operation, for example, flight operation, shipping operation, medical technology and/or railway technology. The second radio unit has an expansion of functionality at its disposal.

By means of such radio devices according to embodiments of the invention, it is possible to fulfil different standards. Accordingly, the radio device can be operated for different applications without being re-certified. The development costs can be considerably reduced as a result.

According to one embodiment, each radio unit provides a separate antenna with its own input unit. This can be meaningful, especially for obtaining a certification to ensure that a radio channel can always be set up, and that the radio unit functions in a physically separated manner. In particular, this may be required for a certified emergency operation.

According to a further embodiment, the first radio unit exchanges information with the second radio unit via a common interface. In this context, the functional efficiency of the second radio unit is tested by means of the first radio unit. In the case of an error of the second radio unit, the first radio unit can thus maintain an emergency communication. This increases the security that a communication is always possible by means of the radio device, especially also in the case of a defect of the second radio unit.

By way of example, an expansion of the functionality of the second radio unit is provided. The expansion of the functionality of the second radio unit is necessary, in particular, in order to guarantee future waveforms and/or future encryption algorithms for the transmission of information by means of the radio device. Accordingly, the second radio unit of the radio device is constantly suitable for new transmission methods and, furthermore, provides a security certification to this effect. In particular, provision is made that the functionality of the first radio unit is not varied, in order to avoid declaring invalid the authorization from the authorized certification authority.

By way of further example, if the input unit for the first radio unit is relatively simple and, by contrast, the input unit of the second radio unit is embodied to be relatively complex, each radio unit can provide its own input unit. Accordingly, the input unit for the first radio unit can be manufactured in a cost-effective manner.

According to a further embodiment, the radio device provides a control interface across which the first radio unit and also the second radio unit receive and/or transmit control data. This can also provide a common voltage supply of the radio units.

By way of example, the first radio unit and the second radio unit access common hardware resources of the radio device, wherein the first radio unit is mutually functionally separated from the second radio unit by means of a software-separation kernel. In particular, this software separation kernel is a security module ("Trusted Platform"), in order to protect all resources, especially CPU, storage and hardware abstractions from unauthorized access and also from access by the respectively other radio unit. In particular, the separation from internal storage regions and processes in stores or respectively time partitions is also achieved. The separation kernel isolates the resources for the respective radio unit. The separation kernel controls the information flows between the individual partitions and between the resources in a controlled manner in the case that the first radio unit and the second radio unit are embodied only as software.

By way of further example, one of the radio units provides a control unit, wherein the control unit controls the boot-up process and the shutdown process of the radio device. Furthermore, the control unit can also be controlled via a user from the outside. The radio unit which provides the control unit is especially operated in the radio device as a master. The switchover between the first radio unit and the second radio unit is especially implemented by means of an external control signal.

By way of further example, if the second radio unit contains an encryption unit, it is ensured in the user interface that no sensitive data are transmitted in the case of the switchover from the second radio unit to the first radio unit.

By way of further example, a monitoring circuit ("Watch-Dog"), can be built into the second radio unit, which automatically switches over to the first radio unit in the case of a disturbance or defect of the second radio unit, in order to maintain a constant radio communication. Alternatively, a switchover from the first radio unit to the second radio unit may be implemented whenever a defect of the first radio unit has been determined.

According to example embodiments, in order to keep down the manufacturing costs of the radio device, as many components as possible in the radio device are used both by the first radio unit and also by the second radio unit. By way of example, the control interface is embodied in such a manner that the first radio unit and also the second radio unit can receive and transmit user data via the common user interface. In this context, level conversion, audio amplification, interface drivers and connection to illuminated displays should especially be embodied jointly.

By way of further example, the input units are embodied jointly, so that, in particular, cosite filters and power amplifiers need not be set up twice. In particular, an FPGA is provided as a digital component in the input unit. In this context, development effort should be weighed against a waste of resources.

According to a further example embodiment of the invention a method for the transmission of information by means of a radio device is provided. The method comprises the method steps: identification of a functionality required for the transmission of the information; and switchover of the radio device to a radio unit appropriate for the functionality required.

By way of example, the required functionality can be an encryption, a specific waveform, a specific transmission method and/or a special frequency.

By way of further example, the radio units can transmit the information in a quasi-parallel manner within defined time slots. In this context, the first radio unit accesses a first storage region, while the second radio unit accesses a separate storage region different from the first storage region. Accordingly, the first storage region and the second storage region are controlled from a security platform.

By way of further example, hailing in the case of an existing communications connection is possible (so-called "hailing"). Accordingly, an existing communications connection is set up between the radio device and a second participant by means of the second radio unit. If a third party not participating in the communicating connection needs to send information to one of the two communicating participants, the third-party hails the existing communicating connection. Now, the existing communication can be encrypted. So, in order to allow the termination of communication and the setup of communication with the third-party as simply as possible, a second communications channel is set up with the non-participating third-party by means of the first radio unit, in order to exchange the information. In this manner, a quasi-parallel communication is possible without endangering the security between the first and the second communications partner. This method is designated as a hailing or break-in method.

BRIEF DESCRIPTION OF THE DRAWINGS

Various example embodiments of the present invention are described in greater detail by way of example with reference to Figures of the drawings, wherein the Figures show only example embodiments of the invention. Identical components in the Figures are marked with identical reference numbers. The drawings show.

DETAILED DESCRIPTION OF THE PREFERRED EMBODIMENTS

Different embodiments will now be described more fully hereinafter with reference to the accompanying drawings, whereby a radio device and a method for the transmission of information which can be manufactured with low development costs and low certification costs, and which provides for fulfilment of different standards and for simple and efficient reconfiguration/expansion for future applications. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
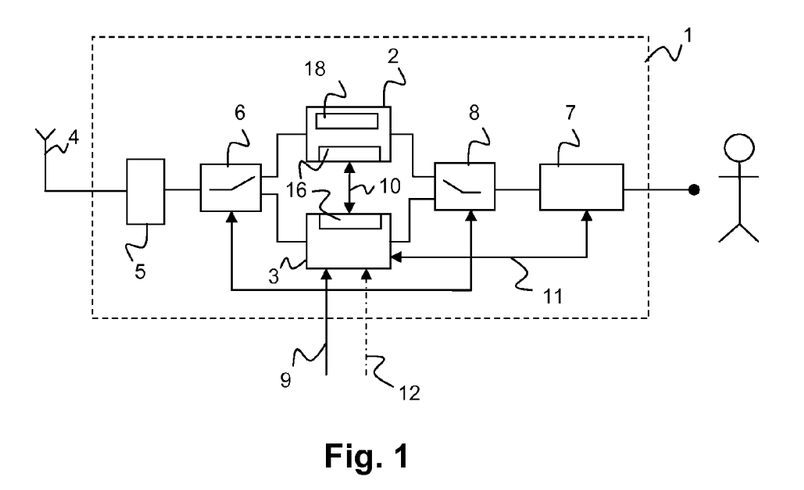
FIG. 1 a block-circuit diagram of a first example of a radio device according to embodiments of the invention.

FIG. 1 shows a first radio device 1 according to an example embodiment of the invention. The radio device 1 provides an antenna 4 and an interface to a user. The antenna 4 is connected to an input unit 5. The input unit 5 is connected to a front-end switchover unit 6. The front-end switchover unit 6 is connected to the first radio unit 2 and respectively to the second radio unit 3. The first radio unit 2 and the second radio unit 3 are connected to an interface switchover unit 8. The common output of the interface switchover unit 8 is connected to the control interface 7, which, in turn, is symbolically connected to a user. The radio unit 2 and the second radio unit 3 each provide a common interface 16. An information exchange 10 takes place via the common interface 16. By means of the information exchange 10, an error function of a radio unit 2, 3 of the respectively other radio unit 2, 3 can be notified or detected by the latter. Furthermore, the first radio unit 2 provides a control unit 18. In particular, the control unit 18 is responsible for a boot-up process and a shutdown process of the entire radio device 1. The radio unit 2 which provides the control unit 18 is operated as a master radio unit.

The number of radio units is not restricted according to the invention. In particular, provision can be made to include further radio units within the radio device 1.

By way of example, the first radio unit 2 is furnished with a certificate through an authorized certification authority. In particular, the certificate is a security certificate. Furthermore, the second radio unit 3 has been certified with a second certificate from an authorized certification authority different from the first certificate. In particular, the certificate of the second radio unit 3 is an information certificate.

By way of further example, provision is made for the first radio unit 2 to provide a simple functionality. This functionality differs from the functionality of the second radio unit 3. In particular, the first radio unit 2 serves for the manufacture and maintenance of an ATC and, furthermore, represents an emergency radio device. This type of emergency radio device must provide a high degree of failsafe security and accordingly provides a high DAL. Any change to this radio unit 2, especially an update or expansion of the functionality, would mean a loss of the certificate, so that the radio device would no longer be authorized for a specific application, especially for aviation or shipping.

By way of further example, the radio device 1 comprises the latest communication means and transmission methods. Accordingly, it is particularly necessary to integrate the latest encryption technologies and also improved waveforms into the radio device 1 according to the invention. Now, in order not to lose the certification for a specific application, provision is made according to the invention to accommodate the functionalities which are to be updated in a second radio unit 3. In particular, the update can be provided via a data interface signal 12 to the second radio unit 3. The certification of the second radio unit 3 is not lost if certification criteria with regard to the expansion of the functionality are observed. Such an approach is made possible, especially with a so-called SCA certification.

By way of further example, alternatively, provision is made to certify the first radio unit 2 for a first standard named above, while the second radio unit 3 is certified for a second standard named above different from the standard of the first radio unit 2. Accordingly, the radio device 1 can be used for different applications, without the need to collect new evaluations or certifications.

In the following, according to example embodiments, the functioning of a radio device 1 according to FIG. 1 is described. To set up a communications channel with an external communications participant, it is first be decided which type of functionality is required in order to set up a communications channel. For example, one specification can be that the communication should take place in an encrypted manner. Furthermore, it may be necessary to use a special wave form or a specific transmission method. It is also possible to observe a special operating mode, wherein, in particular, a defined standby mode can be maintained.

Corresponding to the functionality required, the corresponding radio unit 2 or 3 is selected by means of the control signal 9 or by means of an automation—not shown here. For this purpose, the switchover switches 6, 8 are set by means of a switchover signal to the respective radio unit 2, 3. The radio communication of the respectively other radio unit 2, 3 is monitored via the common interface 16. This monitoring is designated as an information exchange and serves, in particular, to identify errors in the communication via one radio unit 2, 3 and optionally to continue the communication via the respectively remaining, other radio unit 2, 3. This represents an emergency scenario and, in particular, provides the security for the transmission of radio signals by means of the radio device 1 at any time.

By way of example, the switchover functionality via the common interface 16 has the following specific tasks: in the case of the provision of an encryption unit in the second radio unit 3, it must be noted that no sensitive data are transmitted during switching to the first radio unit 2. This is realized via a common interface 16. Furthermore, the first radio unit 2 can monitor the second radio unit 3 and can therefore determine the extent to which the functionality of the second radio unit 3 is provided. If an error is detected, a switchover to the respectively other radio unit is implemented automatically or via a control signal 9. The switchover can also be implemented directly by a user at the radio device 1. This allows a rapid action in emergency situations.

FIG. 1 shows a radio device 1 which provides a large number of common components for the first radio unit 2 and the second radio unit 3. In particular, a common control interface 7 is provided with which the data from a user can be transmitted to the respective radio unit 2, 3. In particular, the user interface 7 comprises level conversions, audio amplifiers, interface drivers, connection to illuminated displays and much besides.

Furthermore, provision is made for a common input unit 5 in FIG. 1. This input unit 5 is also designated as a front-end and especially comprises the entire analogue technology including cosite filter and power amplifier. The front-end 5 can also contain digital components, for example, Field Programmable Gate Arrays, acronym: FPGAs.

Furthermore, provision can be made to extend the power supply over the first radio unit 2 and also the second radio unit 3 in order to ensure that, even in the case of an error function of the second radio unit 3, the power supply is not loaded in such a manner that the radio device 1 fails.

Furthermore, provision is made to separate the radio unit 2 from the radio unit 3 only by means of software technologies, so that common hardware resources can be available. For this purpose in particular, the operating system is provided with a separation kernel 13. It should be noted that the common functionalities of the radio unit 2 and 3 must be developed according to stringent evaluation rules, for example, a high DAL, which can lead to a large development effort. The separation by means of the separation kernel 13 is explained especially with reference to FIGS. 4a and 4b.

By way of example, the radio device 1 is an aircraft radio device. In this context, the flexibility and the expandability of an SCA and, at the same time, the security of an ATC according to the standard DO-178B must be observed. Accordingly, the ATC functionality in the first radio unit 2 is possible under the standard DO-178B or DO-254. Furthermore, an expandable SCA architecture with different waveforms is realized via the second radio unit 3. In this context, on the one hand, a static radio device 1 is obtained through the first radio unit 2, and an updatable dynamic radio device 1 is obtained through the second radio unit 3. The radio device is accordingly certified in all parts. The radio units 2 and 3 are thus implemented with different security requirements, wherein, in particular, a decision is made between Safety and Security Features. Crypto modules according to DO-178 and DO-254 can be realized very simply.

By way of further example, the first radio unit 2 is not expandable, so that the evaluation effort and the certification are minimal. However, especially the second radio unit 3, which is expandable by means of the control signal 9, is certified in a similar manner but with a relatively lower security requirement. The separation of the radio units 2, 3 can be realized by means of hardware and/or software.

Figure 2:
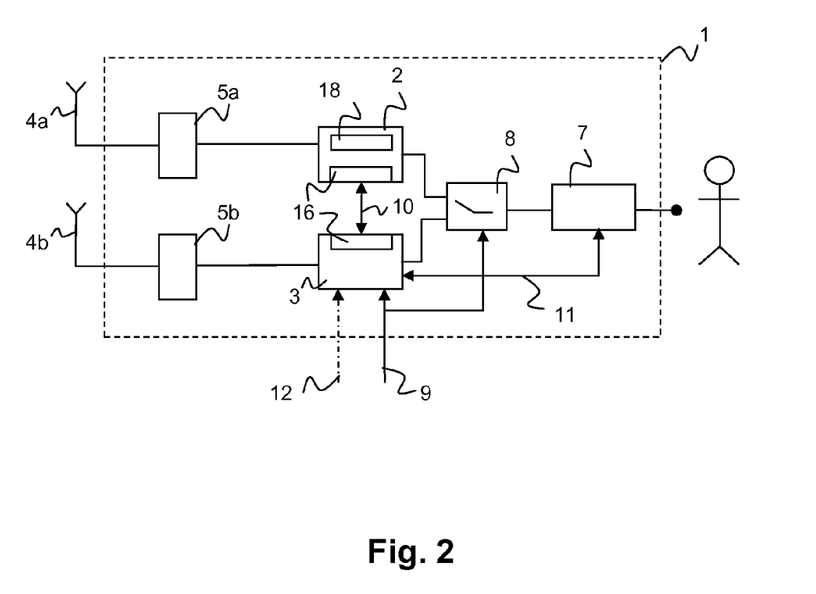
FIG. 2 a block-circuit diagram of a second example of a radio device according to embodiments of the invention.

FIG. 2 shows a block-circuit diagram of a second example of a radio device 1 according to embodiments of the invention. To avoid repetition, reference is made only to the differences of the individual components arranged within the radio device 1. In accordance with the embodiment of FIG. 2, by way of difference from FIG. 1, the radio device 1 according to FIG. 2 does not provide a common antenna 4, but a separate antenna 4a, 4b is provided for each radio unit 2, 3. The antennas 4a and 4b are each connected to separate input units 5a and 5b. A separation of these front-ends 5a, 5b provides the particular advantage that a relatively simple front-end 5a is very simple to certify and provides a low development effort, thereby allowing more cost-efficient development. Furthermore, it can be required within a standard that, in order to be certified, the radio unit 2, 3 to be certified must comprise an input unit 5a, 5b embodied to be exclusive or respectively an exclusive antenna 4a, 4b.

Figure 3:
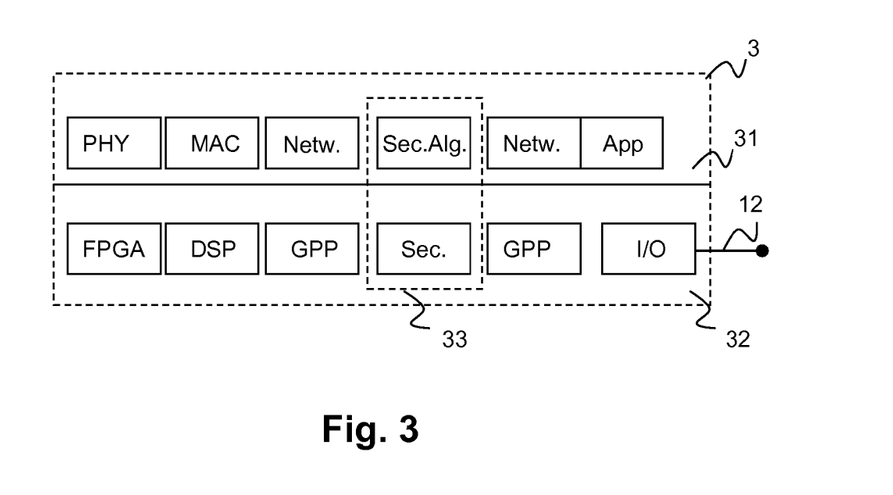
FIG. 3 a block diagram of a radio unit of a radio device according to example embodiments of the invention.

FIG. 3 shows, by way of example, a block diagram of a radio unit of a radio device according to example embodiments of the invention. In this context, a platform component 32 is illustrated in conjunction with a wave form component 31. By way of example, the separation between the first radio unit 2 and the second radio unit 3 can be implemented via hardware and/or software. According to FIG. 3, the separation is realized via software. It is evident that a common FPGA, a common DSP, a common processor (English: General Purpose Processor, acronym: GPP), and a common input and output interface are provided. By contrast with radio unit 2, radio unit 3 provides an encryption unit for the preservation of an information security. This is realized through a special security module and a security algorithm integrated within the latter.

Figure 4A:
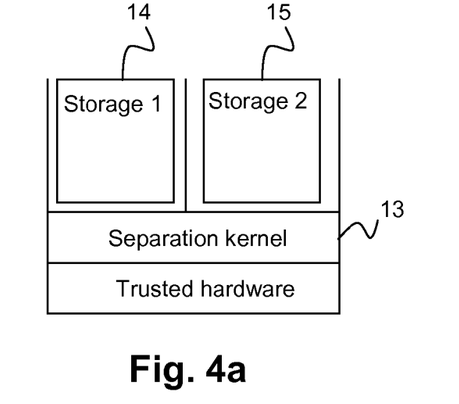
FIG. 4a a block diagram of storage separation by means of a separation kernel within the radio device according to example embodiments of the invention.
Figure 4B:
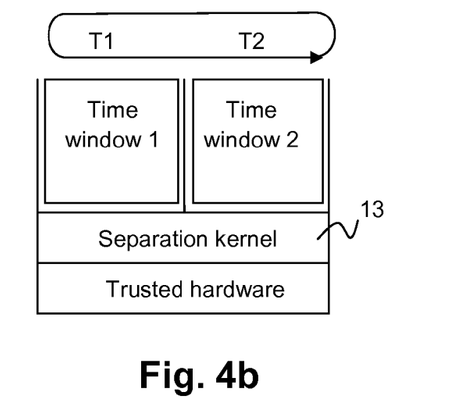
FIG. 4b a process separation in the time-multiplex method in the case of a separation kernel of the radio device according to example embodiments of the invention.

FIGS. 4a and 4b show different separation possibilities with the assistance of which a software-separation kernel 13 realizes the separation of the individual radio units 2, 3, in accordance with example embodiments of the invention.

According to FIG. 4a, a separation is provided with regard to a storage region. For this purpose, a storage 14 is provided for a first radio unit 2. The storage 15 is provided as an alternative for the radio unit 3 embodied with relatively low functionality. The storage regions 14, 15 are assigned exclusively and dynamically.

By way of alternative, FIG. 4b shows a process separation, wherein a first time window is provided in a time-multiplex method in order to transmit information via the first radio unit 2, whereas a second time window is provided in order to provide process resources for the second radio unit 3. By way of example, the separation kernel 13, especially an INTEGRITY-178B, LinuxWorks or VxWorks, has the properties required to protect the resources from unauthorized access, to implement the separation from internal storage regions and processes, to isolate exposed resources, to control the information flow between partitions themselves and between partitions and exposed resources in a controlled manner and to offer an audit service.

Figure 5:
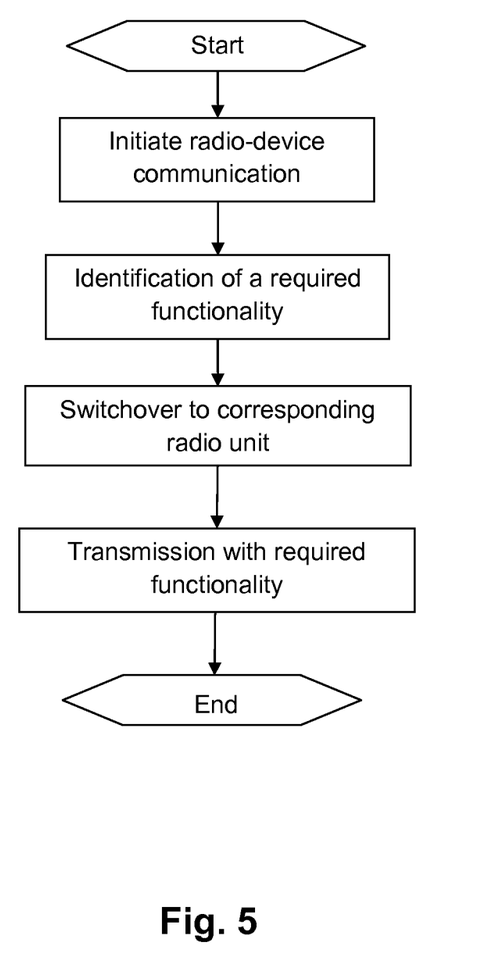
FIG. 5 a process flow diagram of a method for the transmission of information according to example embodiments of the invention.

FIG. 5 illustrates a process flow diagram of a method according to example embodiments of the invention for the transmission of information by means of the radio device 1. In a first step, the radio-device communication is initiated. In this context, a required functionality for the radio-device communication is identified, especially automatically or via an external control interface 9. Following this, the transmission of the information with the required functionality is implemented.

By way of example, a property required for the communication is provided as a functionality, especially an encryption algorithm, a specific waveform and/or a specific transmission type.

Within the scope of the invention, all of the elements described and/or illustrated and/or claimed can be combined arbitrarily with one another. In particular, the device and method features can be combined arbitrarily with one another.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio device comprising:
    a first radio unit configured to provide at least a first functionality, wherein the first radio unit is certified for the first functionality by a security certificate signifying an authorized certification corresponding to at least the first functionality;
    a second radio unit configured to provide at least a second functionality, wherein the second radio unit is certified for the second functionality by an information certificate signifying an authorized certification corresponding to at least the second functionality;
    one or more switching components; and
    a controller configured to identify a functionality required for a received radio communication, and to execute, via the one or more switching components, an operational switchover of the received radio communication either to the first radio unit when the required functionality of the radio communication includes the first functionality, or to the second radio unit when the required functionality includes the second functionality; and
    wherein the second functionality of the second radio unit complies with a design assurance level associated with the information certificate, and the first functionality of the first radio unit complies with a design assurance level associated with the security certificate, where the design assurance level associated with the security certificate is higher than that associated with the information certificate.

2. The radio device according to claim 1, wherein the second radio unit is configured to be expandable with regard to its functionality, without affecting its certification status.

3. The radio device according to claim 1, wherein each of the radio units includes a separate antenna and input unit.

4. The radio device according to claim 1, wherein the first radio unit is further configured to exchange information with the second radio unit via a common interface.

5. The radio device according to claim 1, further comprising:
    a control interface, via which the first radio unit and the second radio unit receive and/or transmit control data.

6. The radio device according to claim 1, wherein the first radio unit and the second radio unit is each configured to access common hardware resources of the radio device, and is each configured as being functionally separable from the other by means of a software separation kernel.

7. The radio device according to claim 1, wherein a one of the radio units comprises a control unit configured to control a boot-up process and shutdown process of the radio device.

8. The radio device according to claim 1, wherein the controller is further configured to execute an operational switchover, via the one or more switching components, from a first of the radio units to a second of the radio units in response to an external control signal.

9. The radio device according to claim 1, wherein each of the radio units is configured to transmit information in defined time slots.

10. The radio device according to claim 1, further comprising:
a first memory storage and a second memory storage; and
a security platform configured to control the first and second memory storage; and
wherein the first radio unit is configured to access the first memory storage, and the second radio unit is configured to access the second memory storage.

11. The radio device according to claim 1, wherein the first radio unit is further configured to implement a hailing, and wherein, in the case of an existing communications connection by means of the second radio unit, in response to the hailing, the controller is configured to execute a switchover, via the one or more switching components, of the existing communications connection from the second radio unit to the first radio unit.

12. A method for radio communication of information via a radio communications device, the method comprising:
receiving, by the radio communications device, an initiation of a radio communication, wherein the radio communications device includes at least two radio units, a first of the radio units being configured for at least a first functionality and being certified for the first functionality by a security certificate signifying an authorized certification corresponding to at least the first functionality, and a second of the radio units being configured for at least a second functionality and being certified for the second functionality by an information certificate signifying an authorized certification corresponding to at least the second functionality, and wherein the second functionality of the second radio unit complies with a second design assurance level associated with the information certificate, and the first functionality of the first radio unit complies with a first design assurance level associated with the security certificate, where the first design assurance level is higher than that of the second design assurance level;
identifying functionality required for the radio communication; and
executing, via one or more switching units of the radio communications device, an operational switchover of the radio communication either to the first radio unit when the required functionality includes the first functionality, or to the second radio unit when the required functionality includes the second functionality.

13. The method according to claim 12, further comprising:
exchanging information between the first and second of the radio units via a common interface of the radio communications device.

14. The method according to claim 12, further comprising:
one or more of receiving and transmitting control data by one or more of the first and second of the radio units via a control interface of the radio communications device.

15. The method according to claim 12, further comprising:
executing, by the first of the radio units, a hailing function; and
in the case of an existing communications connection by means of the second radio unit, executing a switchover, in response to the hailing, of the existing communications connection from the second radio unit to the first radio unit.

16. The method according to claim 12, further comprising:
accessing, by one or more of the first and second radio units, common hardware resources of the radio communications device.

* * * * *

UNITED STATES PATENT AND TRADEMARK OFFICE
CERTIFICATE OF CORRECTION

Page 1 of 1

PATENT NO. : 9,615,251 B2
APPLICATION NO. : 14/628129
DATED : April 4, 2017
INVENTOR(S) : Torsten Langguth, Michael Ebersberger and Rainer Storn It is certified that error appears in the above-identified patent and that said Letters Patent is hereby corrected as shown below:

On the Title Page

Item [72], the third inventor should read:
-- Rainer Storn --

Signed and Sealed this
Twelfth Day of February, 2019

Andrei Iancu
*Director of the United States Patent and Trademark Office*